US012613685B2

(12) United States Patent
Lo et al.

(10) Patent No.: US 12,613,685 B2
(45) Date of Patent: Apr. 28, 2026

(54) REGISTER ALLOCATION OPTIMIZATION USING PER-REGISTER BIN PACKING

(71) Applicant: Mellanox Technologies, Ltd., Yokneam (IL)

(72) Inventors: Alan Lo, Boulder, CO (US); Krishna Garlapati, Los Gatos, CA (US); Stephen Warren, Fort Collins, CO (US); Emre Orbay, San Francisco, CA (US); Alexander Efimov, Sunnyvale, CA (US)

(73) Assignee: Mellanox Technologies, Ltd., Yokneam (IL)

( * ) Notice: Subject to any disclaimer, the term of this patent is extended or adjusted under 35 U.S.C. 154(b) by 170 days.

(21) Appl. No.: 18/309,987

(22) Filed: May 1, 2023

(65) Prior Publication Data

US 2024/0370242 A1 Nov. 7, 2024

(51) Int. Cl.
*G06F 8/51* (2018.01)
*G06F 9/30* (2018.01)

(52) U.S. Cl.
CPC ............ *G06F 8/51* (2013.01); *G06F 9/30101* (2013.01)

(58) Field of Classification Search
None
See application file for complete search history.

(56) References Cited

U.S. PATENT DOCUMENTS

| | | | | |
|---|---|---|---|---|
| 5,165,038 A | * | 11/1992 | Beard ................... | G06F 9/3802 |
| | | | | 714/E11.21 |
| 6,408,433 B1 | * | 6/2002 | Click, Jr. ................ | G06F 8/441 |
| | | | | 717/154 |
| 7,185,329 B1 | * | 2/2007 | Verbitsky ................ | G06F 8/441 |
| | | | | 717/155 |
| 2003/0079212 A1 | * | 4/2003 | Park ........................ | G06F 8/441 |
| | | | | 717/154 |
| 2003/0188299 A1 | * | 10/2003 | Broughton .............. | G06F 8/445 |
| | | | | 717/141 |
| 2005/0240745 A1 | * | 10/2005 | Iyer ..................... | G06F 13/1668 |
| | | | | 711/E12.079 |

(Continued)

OTHER PUBLICATIONS

Tallam, S. and Gupta, R., "Bitwidth Aware Global Register Allocation," POPL '03, 2003, 12 pp., last retrieved from https://www.cs.ucr.edu/~gupta/research/Publications/Comp/popl03.pdf on Dec. 12, 2024 (Year: 2003).*

(Continued)

*Primary Examiner* — Andrew M. Lyons
(74) *Attorney, Agent, or Firm* — Lowenstein Sandler LLP

(57) ABSTRACT

Systems and methods to perform per-register bin packing are disclosed. A system may include a memory and one or more processors coupled to the memory. The one or more processors may determine a first live range of a first variable in a source code and a second live range of a second variable in the source code. The first live range and the second live range may overlap in time during execution of an output code. The one or more processors may generate the output code including a first instruction for the first variable and a second instruction for the second variable. The first instruction may include a first register identifier, a first mask, and a first offset. The second instruction may include the first register identifier, a second mask, and a second offset.

20 Claims, 5 Drawing Sheets

300

(56)      References Cited

U.S. PATENT DOCUMENTS

2008/0307177 A1 *   12/2008  Daimon  ................. G06F 8/443
                                                            711/170
2011/0161945 A1 *    6/2011  Kalogeropulos  ....... G06F 8/441
                                                            717/152

OTHER PUBLICATIONS

R. L. Bowman, E. J. Ratliff and D. B. Whalley, "Decreasing process memory requirements by overlapping program portions," Proceedings of the Thirty-First Hawaii International Conference on System Sciences, Kohala Coast, HI, USA, 1998, pp. 115-124 vol 7. (Year: 1998).*

Li B et al., "Bit Section Instruction Set Extension of Arm for Embedded Applications," Proceedings of the 2002 international conference on Compilers, architecture, and synthesis for embedded systems, Oct. 2002, pp. 69-78.

Office Action for Germany Patent Application No. 102024111541, mailed Mar. 30, 2025, 16 Pages.

* cited by examiner

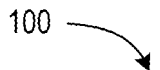
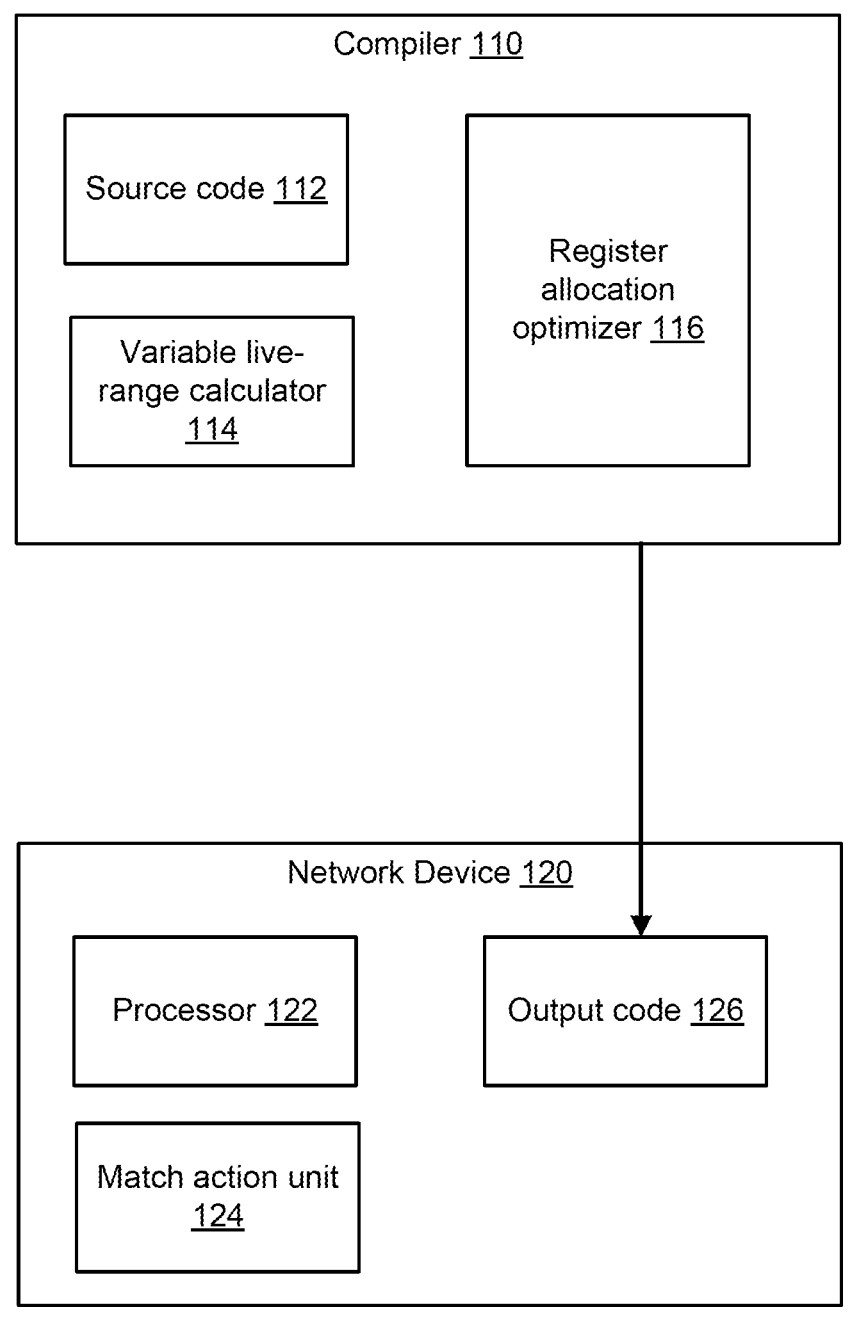
FIG. 1

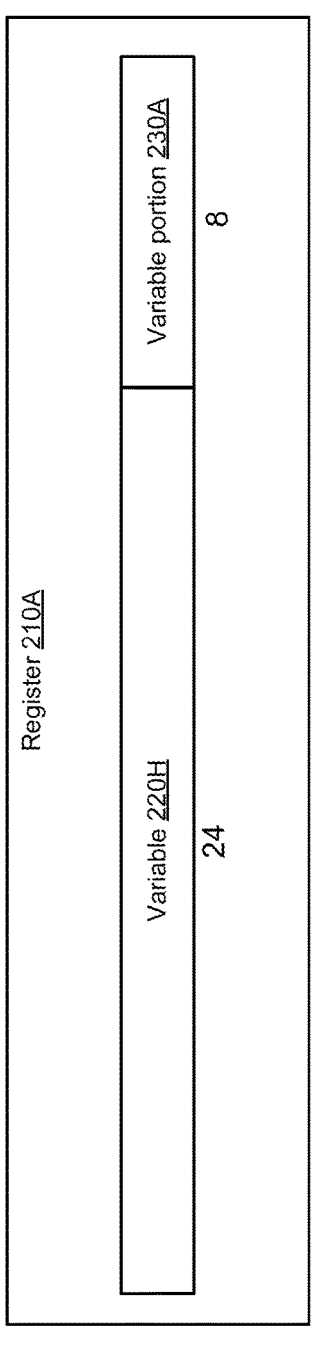
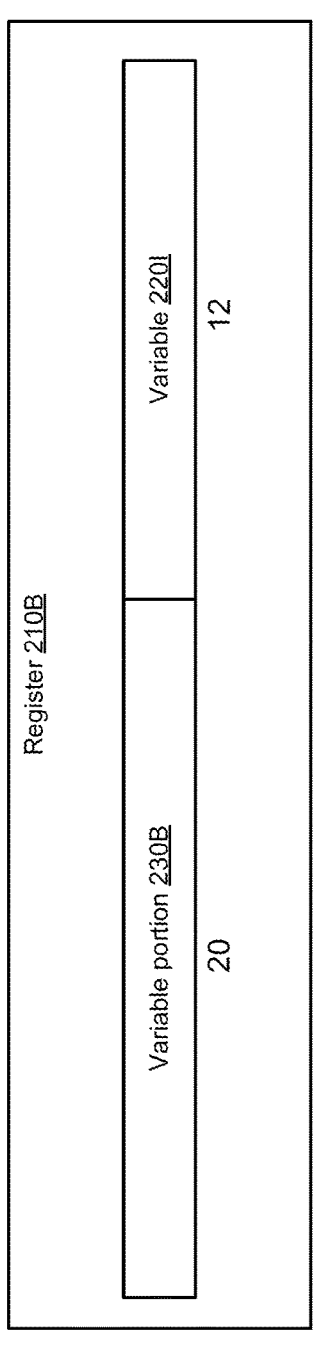
FIG. 2B

300

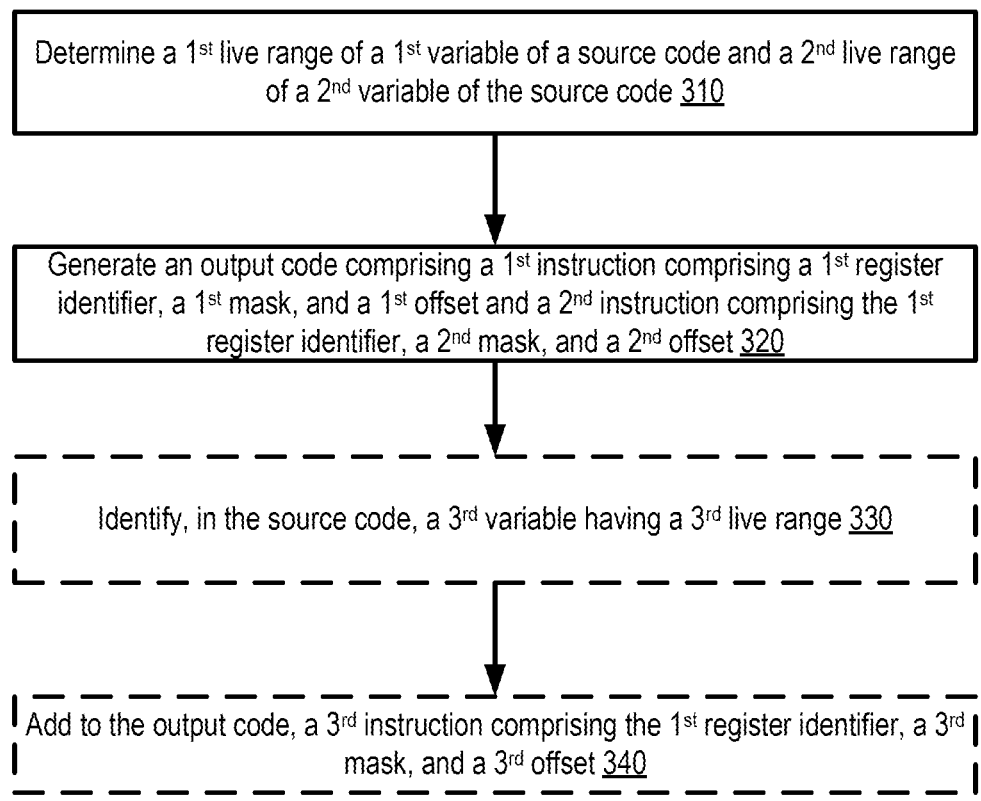

Determine a 1st live range of a 1st variable of a source code and a 2nd live range of a 2nd variable of the source code 310

Generate an output code comprising a 1st instruction comprising a 1st register identifier, a 1st mask, and a 1st offset and a 2nd instruction comprising the 1st register identifier, a 2nd mask, and a 2nd offset 320

Identify, in the source code, a 3rd variable having a 3rd live range 330

Add to the output code, a 3rd instruction comprising the 1st register identifier, a 3rd mask, and a 3rd offset 340

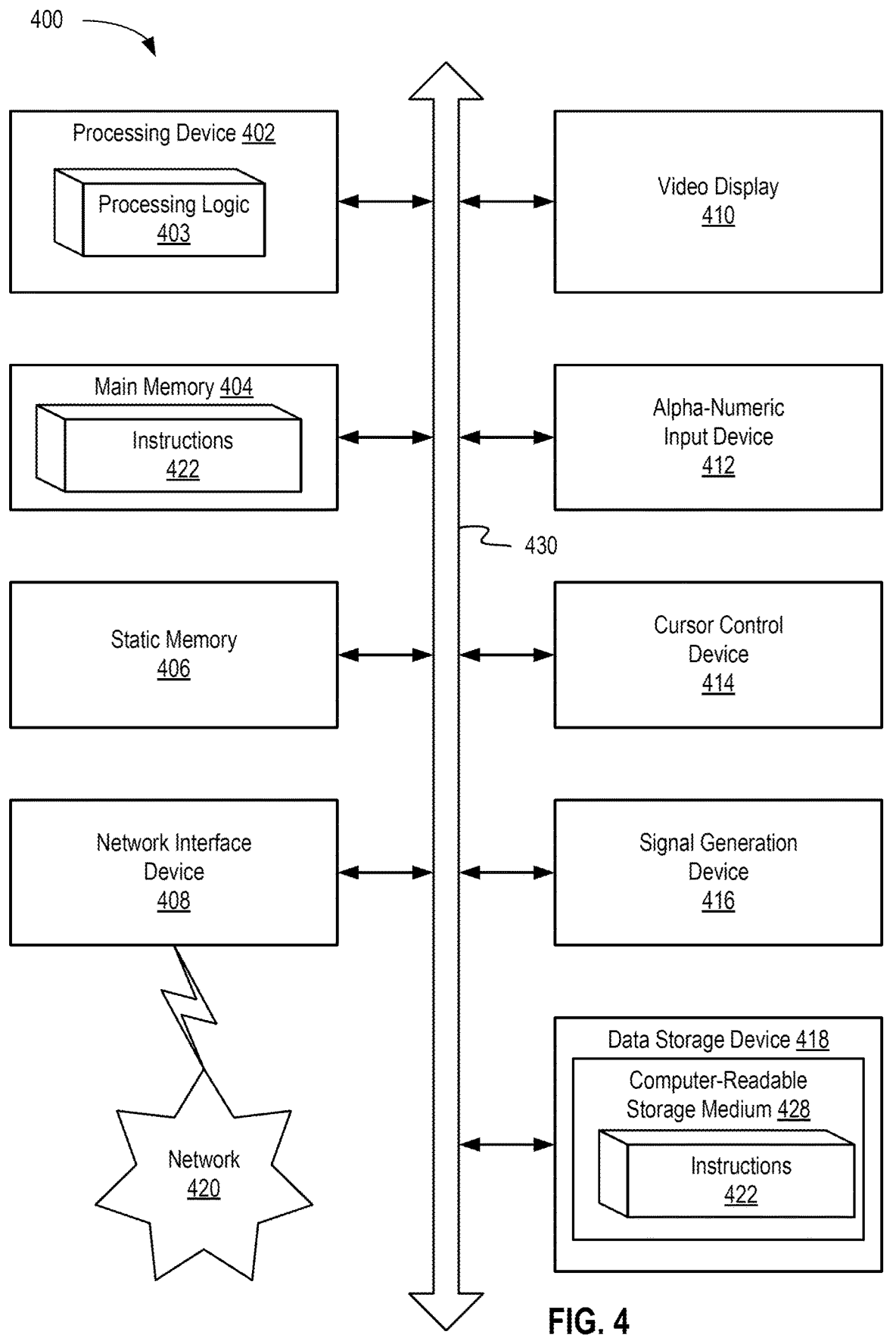

Processing Device 402

Processing Logic
403

Video Display
410

Main Memory 404

Instructions
422

Alpha-Numeric
Input Device
412

430

Static Memory
406

Cursor Control
Device
414

Network Interface
Device
408

Signal Generation
Device
416

Network
420

Data Storage Device 418

Computer-Readable
Storage Medium 428

Instructions
422

FIG. 4

REGISTER ALLOCATION OPTIMIZATION USING PER-REGISTER BIN PACKING

TECHNICAL FIELD

At least one embodiment pertains to systems and methods for compiling a source code, and more specifically but not exclusively, for compiling a source code to be executed by a networking device.

BACKGROUND

A source code of a program may need to be compiled into another code (e.g., machine code, bytecode) before being executed by a processor. During compilation, a compiler may assign variables of the source code to specific registers of a processor that will execute the compiled code.

BRIEF DESCRIPTION OF DRAWINGS

FIG. 1 illustrates an example system for compiling and executing a source code using per-register bin packing, in accordance with at least some embodiments;

FIGS. 2A-B illustrate diagrams representing example registers packed with more than one variable at a time, in accordance with at least some embodiments;

FIG. 3 is a flow diagram of an example method of compiling a source code using per-register bin packing, in accordance with at least some embodiments;

FIG. 4 depicts a block diagram of an example computer device capable of compiling a source code using per-register bin packing, according to at least one embodiment.

DETAILED DESCRIPTION

Figure 2A:
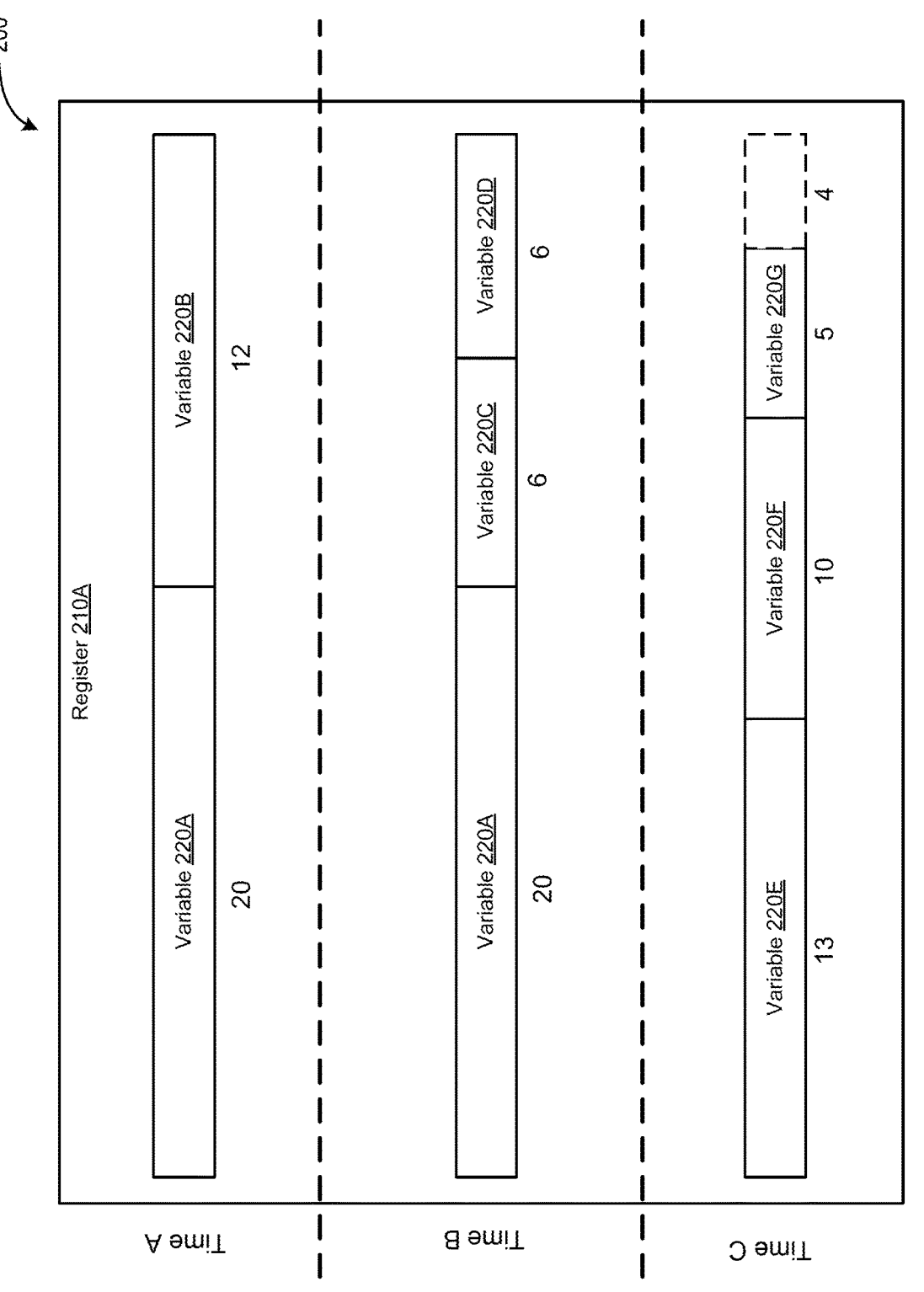

An optimizing compiler takes variables defined by the program and attempts to assign them to a limited number of machine registers. Sometimes there are insufficient discrete registers to store all the discrete program variables required at a given point in time in the program control flow. The corresponding variable data should then be "spilled" to system memory (e.g., random-access memory (RAM)), where it is stored until it is needed and a register is available. On many network device architectures this creates significant latency in packet processing due to overheads associated with accessing the data from system memory. Some devices, such as high throughput switching application specific integrated circuits (ASICs), may not have any system memory that variable data can be "spilled" to during packet processing.

Some existing solutions require providing a larger number of machine registers so the computation can be performed in the pipeline, at the cost of design complexity, die size and power usage. Other existing solutions require providing system memory to spill the data, resulting in increased latency in the packet processing. Yet other solutions require that the compiler fail to generate the desired program, thus forcing the user to rewrite the program's logic if possible.

Aspects and embodiments of the present disclosure address these and other technological challenges by allowing for a discrete register of a device to simultaneously store data of multiple variables, thus increasing the number of variables that can be stored in a limited number of registers. Some embodiments of the present disclosure may include performing a register allocation scheme (e.g., Chaitin, Briggs, or the like) on a programming code to obtain 1) a set of variable definition-use chains and their live ranges and 2)

the non-overlapping live ranges of the variables. Each definition-use chain may correspond to a data structure that consists of a definition of a variable in the programming code and all the uses of the variable reachable from that definition without any intervening definitions. The definition-use chains of each variable may be compared to determine which variables are used simultaneously by the processor (e.g., variables with overlapping live ranges) and which variables are not used simultaneously by the processor (e.g., variables with non-overlapping live ranges). A first variable may have more than one definition-use chain and may overlap with a second variable at some times and may not overlap with the second variable at other times.

Based on the definition-use chains and the live ranges, each variable may be assigned to a free region of a register. For example, a 32-bit register may hold 4 distinct 8-bit values. In another example, a 32-bit register may hold 32 distinct 1-bit values. Each variable may be assigned to a register with an associated mask and offset. The mask may be a bitmask that identifies which bits of the register are associated with a packed variable. The offset may be used to indicate how much the bits of the register should be shifted (e.g., left-shifted, right-shifted) when a packed variable is accessed. For variables whose live ranges overlap in time during execution (e.g., if the processor needs access to each variable's value at the same time), these variables may be assigned to a register at different offsets. For variables whose live ranges do not overlap in time during execution (e.g., if the processor does not need access to each variable's value at the same time), one or more of these variables may be assigned to the same offset of a given register. Bin packing (e.g., assigning items of different sizes into a finite number of bins) can be performed to store the values of the greatest number of variables in the fewest registers. In some embodiments, variable values can be assigned to a register one at a time, before considering the next variable and its value (e.g., "online" mode). In such a case, a "next fit," "first fit," "best fit," or "worst fit" algorithm can be used to assign variables to registers. In some embodiments, access to all variables and their sizes can be provided before assigning any variable to a register (e.g., "offline" mode). In such a case, "best fit decreasing" or a "first fit decreasing" algorithm can be used to assign variables to registers.

A "next fit" bin packing algorithm may keep one bin (e.g., register) "open" at a time. If the current variable being packed does not fit in the "open" register, the register is "closed," and the next register is "opened." Once the variable fits into the "open" register, the next variable may be considered. A "first fit" bin packing algorithm may keep all bins (e.g., registers) "open" and may pack a variable into the first register the variable fits in. A "best fit" bin packing algorithm may keep all bins "open" and may pack a variable into the register that is the most full that the variable fits in. A "worst fit" bin packing algorithm may keep all bins "open" and may pack a variable into the register that is the least full that the variable fits in. A "best fit decreasing" bin packing algorithm may sort the variables by length in decreasing order and pack, in order, each variable into the fullest register in which the variable fits. A "first fit decreasing" bin packing algorithm may sort the variables by length in decreasing order, order the registers, and pack, in order, each variable into the first register in which the variable fits.

In some embodiments, a variable may not fit in a single register and can be split into chunks that are allocated across multiple registers. When a logical operation is performed on a split variable, more than one instruction (e.g., one instruction per chunk) can be used to perform the operation.

In some embodiments, code can be compiled to be used on a device that has match action units (e.g., network switch, network router, etc.). The match action units may be ternary content-addressable memory (TCAM), which can efficiently (e.g., in one or a few instructions) access the packed values in a register using a mask and/or offset. In some embodiments, code can be compiled to be used on a device with a traditional CPU, which may require multiple instructions each time packed values are accessed from a register.

The advantages of the disclosed techniques include but are not limited to allowing larger computation (e.g., increased scale) to be implemented by machines with limited register space and limited (or no) external memory by packing multiple variables into a single register. In some embodiments, performance (e.g., execution speed) may be increased because the values stored in registers can be accessed with a lower latency as compared to values that are spilled into memory.

FIG. 1 illustrates an example system 100 for compiling and executing a source code using per-register bin packing, in accordance with at least some embodiments. System 100 may include a compiler 110 and a network device 120. Compiler 110 may be included in another system, such as a desktop computer, a server, a laptop computer, a tablet computer, and/or any suitable computing device capable of performing the techniques described herein. Compiler 110 may be a computer program that translates source code 112 into a compiled code (e.g., output code 126). Source code 112 may correspond to a program to be executed on a device (e.g., network device 120). The program corresponding to source code 112 can be executed on the same device as compiler 110 or on another device. In some embodiments, source code 112 may be a P4 program (e.g., a program in a programming language for controlling packet forwarding planes in networking devices such as routers and switches). Compiler 110 may include multiple components (e.g., module or routines) such as a variable live-range calculator 114 and a register allocation optimizer 116. Compiler 110 can analyze source code 112, using variable live-range calculator 114, to determine variable definition-use chains (DU chains) and variable live ranges of source code 112. Variable live-range calculator 114 may perform a register allocation scheme (e.g., Chaitin, Briggs, Poletto, or the like) to determine the variable DU chains and live ranges. Using register allocation optimizer 116, compiler 110 may generate output code 126 based on the DU chains and live ranges of the variables of source code 112.

Output code 126 may be a machine code, bytecode, or the like to be executed by a processor (e.g., processor 122). In some embodiments, output code 126 may be executed by a general-purpose central processing unit (CPU), a field-programmable gate array (FPGA), a system-on-chip, a network processor, and/or an application specific integrated circuit (ASIC). Output code 126 may include one or more instructions corresponding to source code 112. Individual instructions of output code 126 may access (e.g., read from, write to, load from, store to) registers of a processor that is executing output code 126. In some embodiments, output code 126 may include instructions pertaining to network packet routing. For example, the instructions, when executed, may cause a processor to process a network packet and to determine a destination of the network packet.

Compiler 110 may receive one or more attributes of the processor that will be executing the compiled program and may compile source code 112 specifically for that processor. The one or more attributes may include a number of registers of the processor and a size of each register. Based on the number of registers available and their corresponding sizes, and based on the determined DU chains and variable live ranges, register allocation optimizer 116 may assign each variable to a register or a portion of a register. For example, source code 112 may include a first variable with a first live range and a second variable with a second live range. The first live range may overlap the second live range in time during execution of the compiled code (e.g., if the processor needs access to both the first variable and the second variable at a same moment in time). Latency of the execution of the compiled code can be reduced if the variables are stored in registers instead of system memory. Thus, it may be advantageous to store both the first variable and the second variable in registers of the processor instead of storing the variables in system memory.

In some embodiments, a source code may include a number of variables having concurrently overlapping live ranges that is greater than a number of processor registers available on a device. In order to increase the number of variables that can be simultaneously stored in the limited number of discrete registers of a processor of the device, register allocation optimizer 116 may generate instructions (e.g., in output code 126) that cause more than one variable to be stored in a single register at the same time. For example, because the first live range and the second live range overlap, register allocation optimizer 116 may include in output code 126 a first instruction for the first variable. The first instruction may include a first register identifier, a first mask, and a first offset. Register allocation optimizer 116 may also include in output code 126 a second instruction for the second variable, the second instruction including the first register identifier, a second mask, and a second offset. The first (second) mask may correspond to a length (e.g., number of bits) of the first (second) variable. The first (second) offset may depend on a size of the register and on free space available in the register. The first offset and the second offset may be selected by register allocation optimizer 116 such that bits of the first variable do not overlap bits of the second variable when, during execution of the compiled code, the variables simultaneously reside in the register.

As a non-limiting example, a first register of a processor may have a size of 32-bits. The first variable may have a length of 16 bits. The second variable may have a length of 16 bits. The first instruction for the first variable may include an identifier of the first register, a first mask of 0xFFFF, and a first offset of 0. The first instruction may also include a value of the first variable to be stored in the register. After execution of the first instruction, the first variable may be stored in bits 0-15 of the first register. The second instruction for the second variable may include an identifier of the first register, a second mask of 0xFFFF, and a second offset of 16. The second instruction may also include a value of the second variable to be stored in the register. After execution of the second instruction, the second variable may be stored in bits 16-32 of the first register. Thus, both the first variable and the second variable may reside simultaneously in the same register (e.g., a register identified by the first register identifier) during execution of the compiled code.

In some embodiments, the mask and offset associated with a variable may be represented as a start bit and an end bit. For example, the first variable with a mask of 0xFFFF and an offset of 0 may be represented as having a start bit of 0 and an end bit of 15. The second variable with a mask of 0xFFFF and an offset of 16 may be represented as having a start bit of 16 and an end bit of 32.

In some embodiments, to extract a variable's value from a register, the mask is applied to the register after shifting the value of the register according to the associated offset. To pack the variable's value in the register, the mask is applied to the variable's value before the variable is shifted according to the offset and combined (e.g., bitwise OR operation) with the value of the register.

In some embodiments, to extract a variable's value from a register, the mask is applied to the register before shifting the value of the register according to the associated offset. To pack the variable's value in the register, the mask is applied to the variable's value after shifting the variable according to the offset but before combining the variable with the register.

During compilation of source code 112, compiler 110 may keep track of which variables have been assigned to which registers (or portions of registers) and may keep track of which registers (or portions of registers) are free and can have a variable assigned to it. For example, at the end of the DU chain for the first variable, compiler 110 may mark bits 0-15 of the first register as free and may subsequently generate instructions for one or more variables to use those same bits in the first register.

Compiler 110 may perform bin packing to store the values of the greatest number of variables in the fewest registers. In some embodiments, compiler 110 may operate in an "online mode" and may assign variables to a register one at a time, before considering the next variable, its value, and its length (e.g., size in bits, bit width). During operation in "online" mode, compiler 110 may use a greedy algorithm (e.g., "next fit," "first fit," "best fit," or "worst fit") to assign variables to free regions of registers. Compiler 110 may use balancing binary search trees during compilation of source code 112. In some embodiments, a greedy algorithm for variable assignment may include putting all registers into a priority queue, with weights of each register determined according to a heuristic function. When a variable needs to be assigned, a register may be popped off the top of the queue. If the register has enough contiguous bits to fit the variable, the variable may be assigned to the free region of the register. Otherwise, another register may be popped off the top of the queue until a register with sufficient space is found for the variable. In some embodiments, the heuristic function may count the number of bits allocated in each register and use the count as a weight for each register in the priority queue. In some embodiments, the heuristic function may only count the number of bits allocated in each register that interfere with (e.g., overlap during execution time) the current variable that is being packed.

In some embodiments, compiler 110 may operate in an "offline" mode and may have access to all variables and their sizes before assigning any variable to a register. During operation in "offline" mode, compiler 110 may use a "best fit decreasing" or a "first fit decreasing" algorithm to assign variables to free regions of registers.

Variables may be assigned such that variables that do not have overlapping live ranges can coexist in the same register and bit offset. Variables that have overlapping live ranges may be kept distinct, either with variables in the same register residing at offsets such that their bits do not overlap or with variables residing in different registers.

Network device 120 may execute output code 126. Network device 120 may be a network switch, a network router, or the like, and may include one or more processors 122 and one or more match action units 124. In some embodiments, match action units 124 may include ternary content-addressable memory (TCAM) and/or algorithmic TCAM that can perform key comparison operations using ternary masks. Match action units 124 may be designed with shift and mask operators to make unpacking variables from registers of processor 122 efficient. In some embodiments, the packed registers may be accessed as keys in a lookup table. During compilation, a packed register may be assigned as a lookup key. Masks calculated during compilation may be associated with each lookup key. A lookup value (e.g., data from a packet header field) may be copied to a temporary register. The value may be shifted and masked based on the offset and mask calculated during compilation. Then a register-to-register comparison may be performed. If the comparison is equal, the lookup has succeeded. In some embodiments, a packed register can be operated on as part of an action arithmetic logic unit (ALU). For example, the output code may include an operation instruction that causes a packed register to be loaded to a temporary register, shifted based on the calculated offset, and masked using the calculated mask. An operation (e.g., addition, subtraction, bit-shift, etc.) may be performed, and the new value may be stored. In some embodiments, the new value may be stored in the same register with the same offset and mask. In some embodiments, the new value may be stored in the same register with a different offset and/or mask or in a different register with a corresponding offset and mask.

FIGS. 2A-B illustrate diagrams 200 and 250 representing example registers 210A and 210B packed with more than one variable at a time, in accordance with at least some embodiments. With reference to FIG. 2A, diagram 200 may include register 210A, which may be a processor register having a size of 32 bits. Register 210A may result in the configurations shown due to execution of the instructions included in the compiled code by the per-register bin-packing compiler.

At a first time (Time A) during execution of the compiled code generated by a per-register bin-packing compiler (e.g., compiler 110 of FIG. 1), register 210A may include variable 220A and variable 220B. Variables 220A and 220B may have overlapping live ranges and may reside in register 210A simultaneously. Variable 220A may have a length of 20 bits and may have an associated offset of 0 and an associated mask of 0xFFFFF. Variable 220B may have a length of 12 bits and may have an associated offset of 20 and an associated mask of 0xFFF. The mask and offset of variable 220B may cause bits of variable 220B not to overlap bits of variable 220A during execution of the compiled code.

At a second time (Time B) during execution of the compiled code, register 210A may include variable 220A, variable 220C, and variable 220D. Variable 220A may have a live range that overlaps with live ranges of variables 220C and 220D, while the live range of variable 220B may not overlap with the live ranges of variables 220C and 220D. Variable 220C may have a length of 6 bits and may have an associated offset of 20 and an associated mask of 0x3F. Variable 220D may have a length of 6 bits and may have an associated offset of 26 and an associated mask of 0x3F. Because the live range of variable 220B and the live range of variable 220C do not overlap, the offset of variable 220B may be the same as the offset of variable 220C. At least one bit of variable 220C may overlap at least one bit of variable 220B at different moments during execution of the compiled code.

At a third time (Time C) during execution of the compiled code, register 210A may include variable 220E, variable 220F, and variable 220G. Variables 220E, 220F, and 220G may have live ranges that mutually overlap while not overlapping variables 220A, 220B, 220C, nor 220D. Variable 220E may have a length of 13 bits, an associated offset of 0, and an associated mask of 0x1FFF. Variable 220F may have a length of 10 bits, an associated offset of 13, and an associated mask of 0x3FF. Variable 220G may have a length of 5 bits, an associated offset of 28, and an associated mask of 0x1F. As shown by the hashed box, register 210A may, at a time during execution of the compiled code (e.g., Time C), include empty (free) bits not assigned to a variable.

Referring to FIG. 2B, diagram 250 may include register 210A and register 210B, which may both have a size of 32 bits. If a variable does not fit in the free space available in a first register at a given time, the variable may be split and stored in two (or more) variables. During compilation of the source code, if a variable will not fit in the free space of a single register, the compiler (e.g., compiler 110) may determine the width of a free region of a first register. This width may become the width of a first portion of the variable, and the first portion of the variable may be assigned to that register. The compiler may then determine the width of a free region of a second register and may use that width as the width of a second portion of the variable. The second variable may be assigned to the second register. This process may repeat until all bits of the variable have been assigned to a region of a register. Splitting of variables may be avoided because the variable may require one instruction for each portion of the variable that is stored. For example, if a first portion of a variable is stored in a first register and a second portion of the variable is stored in a second register, the compiled, output code may include a first instruction for the first portion and a second instruction for the second portion.

As a non-limiting example, at a first time (Time A) during execution of a compiled code, register 210A may include variable 220H and variable portion 230A. Variable 220H may have a length of 24 bits, an associated offset of 0, and an associated mask of 0xFFFFFF. Variable portion 230A may be the first (or last) 8 bits of a 28-bit variable. Variable portion 230A may be stored at offset 24 of register 210A with an associated mask of 0xFF. At the same time (Time A) during execution of the compiled code, register 210B may include variable portion 230B and variable 220I. Variable portion 230B may be the remaining 20 bits of the 28-bit variable. Variable portion 230B may be stored at offset 0 with an associated mask of 0xFFFFF. Variable 220I may have a length of 12 bits, an associated offset of 20, and an associated mask of 0xFFF. In some embodiments, live ranges of variables 220H, 220I, and the 28-bit variable that comprises variable portion 230A and 230B may overlap.

FIG. 3 is a flow diagram of an example method 300 of compiling a source code using per-register bin packing, in accordance with at least some embodiments. In some embodiments, method 300 may be performed to compile a code for a program that runs on a network device. For example, compiling such a code may be performed by a compiler 110 of FIG. 1. In some embodiments, method 300 may be performed by one or more circuits or processing logic that may communicate with one or more memory devices. In some embodiments, at least some operations of method 300 may be performed by multiple (e.g., parallel) hardware threads (e.g., of a processing device that is compiling a source code), each thread executing one or more individual functions, routines, subroutines, or operations of the method. In some embodiments, processing threads implementing method 300 may be synchronized (e.g., using semaphores, critical sections, and/or other thread synchronization mechanisms). Alternatively, hardware threads implementing each of method 300 may be executed asynchronously with respect to each other. Various operations of method 300 may be performed in a different order compared with the order shown in FIG. 3. Some operations of method 300 may be performed concurrently with other operations. In some embodiments, one or more operations shown in FIG. 3 may not be performed.

Method 300 may be performed by any suitable processing logic (e.g., CPU, FPGA, etc.) of a computing device that hosts (and executes) compiler 110 of FIG. 1. In some embodiments, method 300 may be used to generate an output code configured to operate a network device for processing of data packets. Processing logic performing method 300 may, at block 310, determine a first live range of a first variable of a source code and a second live range of a second variable of the source code. At block 320, processing logic may generate an output code comprising a first instruction for the first variable and a second instruction for the second variable. The first instruction may include a first register identifier, a first mask, and a first offset. The second instruction may include the first register identifier, a second mask, and a second offset. In some embodiments, processing logic may, at block 330, identify, in the source code, a third variable having a third live range. At block 340, processing logic may add to the output code, a third instruction for the third variable, the third instruction including the first register identifier, a third mask, and a third offset.

FIG. 4 depicts a block diagram of an example computer device 400 capable of compiling a source code using per-register bin packing, according to at least one embodiment. Example computer device 400 can be connected to other computer devices in a LAN, an intranet, an extranet, and/or the Internet. Computer device 400 can operate in the capacity of a server in a client-server network environment. Computer device 400 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" shall also be taken to include any collection of computers that individually or jointly execute a set (or multiple sets) of instructions to perform any one or more of the methods discussed herein.

Example computer device 400 can include a processing device 402 (also referred to as a processor or CPU), a main memory 404 (e.g., read-only memory (ROM), flash memory, dynamic random access memory (DRAM) such as synchronous DRAM (SDRAM), etc.), a static memory 406 (e.g., flash memory, static random access memory (SRAM), etc.), and a secondary memory (e.g., a data storage device 418), which can communicate with each other via a bus 430.

Processing device 402 (which can include processing logic 403) represents one or more general-purpose processing devices such as a microprocessor, central processing unit, or the like. More particularly, processing device 402 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 402 can also be one or more special-purpose processing devices such as an application specific integrated circuit (ASIC), a field programmable gate array (FPGA), a digital signal processor (DSP), network processor, or the like. In accordance with one or more aspects of the present disclosure, processing device 402 can be configured to execute instructions executing method 300 compiling a source code using per-register bin packing.

Example computer device 400 can further comprise a network interface device 408, which can be communicatively coupled to a network 420. Example computer device 400 can further comprise a video display 410 (e.g., a liquid crystal display (LCD), a touch screen, or a cathode ray tube (CRT)), an alphanumeric input device 412 (e.g., a keyboard), a cursor control device 414 (e.g., a mouse), and an acoustic signal generation device 416 (e.g., a speaker).

Data storage device 418 can include a computer-readable storage medium (or, more specifically, a non-transitory computer-readable storage medium) 428 on which is stored one or more sets of executable instructions 422. In accordance with one or more aspects of the present disclosure, executable instructions 422 can comprise executable instructions executing method 300 of compiling a source code using per-register bin packing.

Executable instructions 422 can also reside, completely or at least partially, within main memory 404 and/or within processing device 402 during execution thereof by example computer device 400, main memory 404 and processing device 402 also constituting computer-readable storage media. Executable instructions 422 can further be transmitted or received over a network via network interface device 408.

While the computer-readable storage medium 428 is shown in FIG. 4 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Other variations are within the spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any appropriate nonempty subset of set of A and B and C. For instance, in illustrative example of a set having three members, conjunctive phrases "at least one of A, B, and C" and "at least one of A, B and C" refer to any appropriate of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any appropriate device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example embodiments of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A system comprising:
a memory; and
one or more processors, coupled to the memory, to:
determine a first live range of a first variable in a source code and a second live range of a second variable in the source code, wherein the first live range and the second live range overlap in time during execution of an output code; and
generate the output code comprising:
a first instruction for the first variable, the first instruction comprising a first register identifier, a first mask, and a first offset, wherein the first mask is based on a length of the first variable, and wherein the first mask and the first offset together identify a first region within a first register associated with the first register identifier; and
a second instruction for the second variable, the second instruction comprising the first register identifier, a second mask, and a second offset, wherein the second mask is based on a length of the second variable, and wherein the second mask and the second offset together identify a second region within the first register associated with the first register identifier.

2. The system of claim 1, wherein to determine the first live range of the first variable and the second live range of the second variable, the one or more processors are further to process the source code according to a register allocation scheme.

3. The system of claim 1, wherein the one or more processors are further to:

identify, in the source code, a third variable having a third live range that does not overlap the first live range in time during execution of the output code; and add to the output code a third instruction for the third variable, the third instruction comprising the first register identifier, a third mask, and a third offset.

4. The system of claim 3, wherein the third mask and the third offset cause bits of the third variable not to overlap bits of the second variable.

5. The system of claim 3, wherein the third mask and the third offset cause at least one bit of the third variable to overlap at least one bit of the first variable.

6. The system of claim 1, wherein the source code includes a number of variables having concurrently overlapping live ranges that is greater than a number of processor registers available on a device, the number of variables comprising the first variable and the second variable; and wherein variables of the source code are not stored in a memory of the device during execution of the output code.

7. The system of claim 1, wherein the one or more processors are further to:

add to the output code a third instruction for a first portion of a third variable in the source code, the third instruction comprising the first register identifier, a third mask, and a third offset; and add to the output code a fourth instruction for a second portion of the third variable in the source code, the fourth instruction comprising a second register identifier, a fourth mask, and a fourth offset.

8. The system of claim 1, wherein the one or more processors are further to add to the output code an operation instruction comprising the first register identifier, the first mask, and the first offset.

9. The system of claim 1, wherein to generate the output code, the one or more processors are further to:

identify a bit width of the first variable in the source code;

select, based on the bit width of the first variable, a free register; and assign the first variable to the free register.

10. A method comprising:

determining a first live range of a first variable in a source code and a second live range of a second variable in the source code, wherein the first live range and the second live range overlap in time during execution of an output code; and generating the output code comprising:

a first instruction for the first variable, the first instruction comprising a first register identifier, a first mask, and a first offset, wherein the first mask is based on a length of the first variable, and wherein the first mask and the first offset together identify a first region within a first register associated with the first register identifier; and a second instruction for the second variable, the second instruction comprising the first register identifier, a second mask, and a second offset, wherein the second mask is based on a length of the second variable, and wherein the second mask and the second offset together identify a second region within the first register associated with the first register identifier.

11. The method of claim 10, wherein the first live range of the first variable and the second live range of the second variable are determined according to a register allocation scheme.

12. The method of claim 10, further comprising:

identifying, in the source code, a third variable having a third live range that does not overlap the first live range in time during execution of the output code; and adding to the output code a third instruction for the third variable, the third instruction comprising the first register identifier, a third mask, and a third offset.

13. The method of claim 12, wherein the third mask and the third offset cause bits of the third variable not to overlap bits of the second variable.

14. The method of claim 12, wherein the third mask and the third offset cause at least one bit of the third variable to overlap at least one bit of the first variable.

15. A network device comprising:

one or more processors to execute an output code that corresponds to a source code comprising a first variable having a first live range and a second variable having a second live range;

wherein the first live range and the second live range overlap in time during execution of the output code; and wherein the output code comprises:

a first instruction for the first variable, the first instruction comprising a first register identifier, a first mask, and a first offset, wherein the first mask is based on a length of the first variable, and wherein the first mask and the first offset together identify a first region of a first register associated with the first register identifier; and a second instruction for the second variable, the second instruction comprising the first register identifier, a second mask, and a second offset, wherein the second mask is based on a length of the second variable, and wherein the second mask and the second offset together identify a second region within the first register associated with the first register identifier.

16. The network device of claim 15, wherein the output code comprises instructions pertaining to network packet routing, and wherein the one or more processors execute the instructions in the output code to process a network packet and to determine a destination of the network packet.

17. The network device of claim 15, wherein the source code further comprises a third variable having a third live range that does not overlap the first live range in time during execution of the output code; and wherein the output code further comprises a third instruction comprising the first register identifier, a third mask, and a third offset.

18. The network device of claim 17, wherein the third mask and the third offset cause bits of the third variable not to overlap bits of the second variable.

19. The network device of claim 17, wherein the third mask and the third offset cause at least one bit of the third variable to overlap at least one bit of the first variable.

20. The network device of claim 15, wherein the one or more processors comprise a number of processor registers, and wherein the source code includes a number of variables having concurrently overlapping live ranges that is greater than the number of processor registers, the number of variables comprising the first variable and the second variable; and wherein variables of the source code are not stored in a memory of the network device during execution of the output code.

* * * * *